(12) United States Patent
Meyer et al.

(10) Patent No.: US 10,846,828 B2
(45) Date of Patent: *Nov. 24, 2020

(54) DE-NOISING IMAGES USING MACHINE LEARNING

(71) Applicant: PIXAR, Emeryville, CA (US)

(72) Inventors: Mark Meyer, San Francisco, CA (US); Anthony DeRose, San Rafael, CA (US); Steve Bako, Santa Barbara, CA (US)

(73) Assignee: Pixar, Emeryville, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/390,951

(22) Filed: Apr. 22, 2019

(65) Prior Publication Data

US 2019/0251668 A1 Aug. 15, 2019

Related U.S. Application Data

(63) Continuation of application No. 15/630,478, filed on Jun. 22, 2017, now Pat. No. 10,311,552.

(60) Provisional application No. 62/482,543, filed on Apr. 6, 2017.

(51) Int. Cl.
G06T 5/00 (2006.01)

(52) U.S. Cl.
CPC .... *G06T 5/002* (2013.01); *G06T 2207/20081* (2013.01); *G06T 2207/20084* (2013.01)

(58) Field of Classification Search
CPC ........... G06T 5/002; G06T 2207/20084; G06T 2207/20081; G06T 15/06; G06K 9/0051

USPC ......................... 382/275, 254, 156, 157, 158
See application file for complete search history.

(56) References Cited

U.S. PATENT DOCUMENTS

| 8,542,898 | B2 | 9/2013 | Bathe et al. |
| 10,311,552 | B2 | 6/2019 | Meyer et al. |
| 2010/0044571 | A1 | 2/2010 | Miyaoka et al. |
| 2012/0135874 | A1 | 5/2012 | Wang et al. |
| 2016/0269723 | A1 | 9/2016 | Zhou et al. |
| 2016/0321523 | A1 | 11/2016 | Sen et al. |
| 2017/0091982 | A1 | 3/2017 | Engel et al. |
| 2017/0109925 | A1 | 4/2017 | Gritzky et al. |
| 2017/0256090 | A1 | 9/2017 | Zhou et al. |

(Continued)

OTHER PUBLICATIONS

U.S. Appl. No. 15/630,478, "Notice of Allowance", dated Mar. 19, 2019, 14 pages.

(Continued)

*Primary Examiner* — Geoffrey E Summers
(74) *Attorney, Agent, or Firm* — Kilpatrick Townsend & Stockton LLP

(57) ABSTRACT

The present disclosure relates to using a neural network to efficiently denoise images that were generated by a ray tracer. The neural network can be trained using noisy images generated with noisy samples and corresponding denoised or high-sampled images (e.g., many random samples). An input feature to the neural network can include color from pixels of an image. Other input features to the neural network, which would not be known in normal image processing, can include shading normal, depth, albedo, and other characteristics available from a computer-generated scene. After the neural network is trained, a noisy image that the neural network has not seen before can have noise removed without needing manual intervention.

15 Claims, 11 Drawing Sheets

(56) References Cited

U.S. PATENT DOCUMENTS

| | | |
|---|---|---|
| 2017/0365089 A1 | 12/2017 | Mitchell et al. |
| 2018/0114096 A1 | 4/2018 | Sen et al. |
| 2018/0158233 A1 | 6/2018 | Wyman et al. |
| 2018/0165554 A1 | 6/2018 | Zhang et al. |
| 2018/0204314 A1* | 7/2018 | Kaplanyan ............... G06T 5/002 |

OTHER PUBLICATIONS

U.S. Appl. No. 15/946,649, filed Apr. 5, 2018, 80 pages.
U.S. Appl. No. 15/946,652, filed Apr. 5, 2018, 83 pages.
U.S. Appl. No. 15/946,654, filed, Apr. 5, 2018, 82 pages.
U.S. Appl. No. 16/050,314, filed Jul. 31, 2018, 102 pages.
U.S. Appl. No. 16/050,332, filed Jul. 31, 2018, 103 pages.
U.S. Appl. No. 16/050,336, filed Jul. 31, 2018, 100 pages.
U.S. Appl. No. 16/050,362, filed Jul. 31, 2018, 100 pages.
Bako et al., "Removing Shadows from Images of Documents", Proceedings of ACCV 2016, Available Online at: http://cvc.ucsb.edu/graphics/Papers/ACCV2016_DocShadow/, 2016, 2 pages.
Kalantari et al., "A Machine Learning Approach for Filtering Monte Carlo Noise", ACM Transactions on Graphics, vol. 34, No. 4, Proceedings of ACM SIGGRAPH 2015, Aug. 2015, 12 pages.
Liu, "Machine Learning for Filtering Monte Carlo Noise in Ray Traced Images", Department of Computing, Imperial College London, Jun. 21, 2017, 66 pages.
Luongo et al., "Investigating Machine Learning for Monte-Carlo Noise Removal in Rendered Images", Summer School on Semisupervised Learning, DTU Compute, Department of Applied Mathematics and Computer Science, Aug. 8, 2016, 10 pages.
Szegedy et al., "Going Deeper with Convolutions", Available Online at: https://www.cs.unc.edu/~wliu/papers/GoogLeNet.pdf, 2014, pp. 1-9.
Xie et al., "Image Denoising and Inpainting with Deep Neural Networks", Available Online at: https://papers.nips.cc/paper/4686-image-denoising-and-inpainting-with-deep-neural-networks.pdf, Dec. 3-6, 2012, pp. 1-9.
Xu et al., "Deep Edge-Aware Filters", Proceedings of the 32 nd International Conference on Machine Learning, Lille, France,vol. 37, Available Online at http://www.cs.toronto.edu/~rjliao/papers/ICML_2015_Deep.pdf, Jul. 6-11, 2015, 10 pages.
U.S. Appl. No. 15/946,649, "Notice of Allowance", dated Oct. 25, 2019, 9 pages.
Zhang et al., "SeqGAN: Sequence Generative Adversarial Nets with Policy Gradient", Proceedings of the Thirty-First AAAI Conference on Artificial Intelligence (AAAI-17), 2017, pp. 2852-2858.
U.S. Appl. No. 15/946,654, "Notice of Allowance", dated Oct. 8, 2019, 10 pages.
Bako et al., "Kernel-Predicting Convolutional Networks for Denoising Monte Carlo renderings", ACM Transactions on Graphics, vol. 36, No. 4, Article 97, Jul., 2017, pp. 97:1-97:14.
Papadrakakis et al., "Reliability-Based Structural Optimization using Neural Networks and Monte Carlo Simulation", Computer Methods in Applied Mechanics and Engineering, vol. 191, Issue 32, Jun. 7, 2007, pp. 3491-3507.
Pindoriya et al., "Composite Reliability Evaluation Using Monte Carlo Simulation and Least Squares Support Vector Classifier", IEEE Transactions on Power Systems, vol. 26, No. 4, Nov. 2011, pp. 2483-2490.
Rousselle et al., "Robust Denoising using Feature and Color Information", Computer Graphics Forum, vol. 32, No. 7, Nov. 2013, pp. 121-130.
Zwicker et al., "Recent Advances in Adaptive Sampling and Reconstruction for Monte Carlo Rendering", Computer Graphics Forum, vol. 34, No. 2, 2015, pp. 667-681.

* cited by examiner

DE-NOISING IMAGES USING MACHINE LEARNING

CROSS-REFERENCES TO RELATED APPLICATIONS

The present application is a continuation of, and claims the benefit and priority to U.S. Non-provisional application Ser. No. 15/630,478, filed Jun. 22, 2017, now U.S. Pat. No. 10,311,552, issued Jun. 4, 2019, entitled "DE-NOISING IMAGES USING MACHINE LEARNING," which claims the benefit and priority under 35 U.S.C. 119(e) of U.S. Provisional Application No. 62/482,543, filed Apr. 6, 2017, entitled "DE-NOISING IMAGES USING MACHINE LEARNING," the entire contents of which are incorporated herein by reference for all purposes.

BACKGROUND

Ray tracing is a technique for presenting three-dimensional images on a two-dimensional display by tracing a path of light through pixels on an image plane. The technique is capable of producing extremely high-quality images. For example, the technique can include tracing one or more rays from each pixel in an image. By tracing a ray, a color value for the pixel can be computed. In some examples, different sets of rays can be traced to each pixel in the image such that color values for each pixel are accumulated to generate an image. However, as the number of pixels in an image increases, the computational cost also increases.

In addition, when a ray hits a surface in an image, it can generate new types of rays, e.g., reflection, refraction, and shadow rays. A reflection ray can be traced in the mirror-reflection direction. The closest object the reflection ray intersects can be what will be seen in the reflection. Refraction rays traveling through transparent material can work similarly, with the addition that a refractive ray could be entering or exiting the transparent material. A shadow ray can be traced toward one or more lights. If any opaque object is found between the surface and the light, the surface can be in shadow and the light may not illuminate the surface. However, as the number of additional rays increases, the computational costs for ray tracing increases even further.

In one illustrative example, an equation for a color value of a pixel can be:

$$c_p = \int_{p_x-\frac{1}{2}}^{p_x+\frac{1}{2}} \int_{p_y-\frac{1}{2}}^{p_y+\frac{1}{2}} \int_{t_0}^{1} \int_{-1}^{1} \int_{-1}^{1} \int_{0}^{1} \int_{0}^{1} f(x, y, t, u, v, l_1, l_2) dl_2 dl_1 dv du dt dy dx.$$

In the equation, $c_p$ can be a color of a pixel, the function $f$ (x, y, t, u, v, $l_1$, $l_2$) can represent a scene function that is used to identify the color of the pixel, the integrals for $dl_1$ and $dl_2$ can each represent a light source, the integrals du and dv can represent a lens position, the integral dt can represent a time, and the integrals dx and dy can represent a screen position. However, it should be recognized that the equation above is merely an example. An equation for a color value of a pixel could be different, with more or less variables and/or integrals.

To solve the equation recited above, it is obvious that an exact answer would be computationally expensive. Some solutions include using Monte Carlo samples to evaluate the integrals. However, too few Monte Carlo samples result in noise in a final image (e.g., inaccurate variation of brightness or color information). And the more Monte Carlo samples used, the more computation the final image requires. Therefore, there is a need to reduce the number of samples needed for ray tracing while still producing high-quality images.

BRIEF SUMMARY

The present disclosure relates to using a neural network to efficiently de-noise images that were generated using a ray tracer. The neural network can be trained using noisy images (generated using few samples) and either corresponding de-noised images (generated by applying a denoiser (e.g., filter) to a noisy image) or high-sampled images (generated using many samples). An input feature to the neural network can be associated with color from pixels of an image. For example, the input feature can be the color from pixels of the image. For another example, the input feature can be a variance for samples for each pixel of the image. Other input features to the neural network, which would not be known in normal image processing, can include shading normal, depth, albedo, and other characteristics available from a computer-generated scene (e.g., an animated scene, three-dimensional scene, or an image that was generated by a computer from a scene description). After the neural network is trained, a noisy image that the neural network has not seen before can have noise removed without needing manual intervention.

In some examples, the input and/or output of the neural network can be in the form of one or more image gradients (from which a final image can be generated). In other examples, the input and/or output of the neural network can be in the form of a final image (e.g., for input, the final image can be raw features that would be output from a rendering system).

The structure of the neural network can utilize information from the computer-generated scene, which is not possible in standard image denoising. For example, the neural network can operate on shading normal, depth, or the like. The neural network can also utilize a variance for samples for each pixel of an image, which is also not possible in standard image denoising. For another example, multiple neural networks can each operate on different light paths (e.g., an image generated using specular rays or an image generated using diffuse rays) and then be combined later.

Numerous benefits are achieved by way of the present disclosure over conventional techniques. For example, the present disclosure provides a system to remove noise without having to tune parameters for a denoiser. In addition, previous methods often fail to fix image artifacts in particularly complicated regions, whereas neural networks tend to be artifact free. These and other examples of this disclosure, along with many of its advantages and features, are described in more detail in conjunction with the text below and attached figures.

Other embodiments are directed to systems and computer readable media associated with methods described herein.

A better understanding of the nature and advantages of this disclosure may be gained with reference to the following detailed description and the accompanying drawings.

BRIEF DESCRIPTION OF THE DRAWINGS

Illustrative embodiments are described in detail below with reference to the following figures.

DETAILED DESCRIPTION

The present disclosure relates to using a neural network to efficiently de-noise images that were generated using a ray tracer. The neural network can be trained using noisy images (generated using few samples) and either corresponding de-noised images (generated by applying a denoiser (e.g., filter) to a noisy image) or high-sampled images (generated using many samples). An input feature to the neural network can be associated with color from pixels of an image. For example, the input feature can be the color from pixels of the image. For another example, the input feature can be a variance for samples for each pixel of the image. Other input features to the neural network, which would not be known in normal image processing, can include shading normal, depth, albedo, and other characteristics available from a computer-generated scene (e.g., an animated scene, three-dimensional scene, or an image that was generated by a computer from a scene description). After the neural network is trained, a noisy image that the neural network has not seen before can have noise removed without needing to use a denoiser.

In some examples, the input and/or output of the neural network can be in the form of one or more image gradients (from which images can be generated). In other examples, the input and/or output of the neural network can be in the form of irradiance/color images.

The structure of the neural network can be formed based on knowledge of the computer-generated scene, which would not be known in standard image processing. For example, the neural network can operate on shading normal, depth, or the like. For another example, multiple neural networks can each operate on different light paths (e.g., an image generated using specular rays or an image generated using diffuse rays) and then be combined later to generate the final image comprised of the different types of light paths.

I. Ray Tracing

Figure 1A:
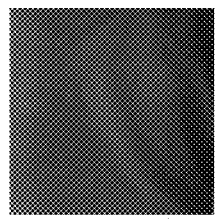
FIG. 1A illustrates an example of an image produced using a ray tracer.

Ray tracing is a technique for presenting computer-generated scenes on a two-dimensional display by tracing a path of a ray through pixels on an image plane. The technique can produce high-quality images (e.g., FIG. 1A), but at a greater computational cost. In some examples, the technique can include tracing a set of rays to a pixel in an image. The pixel can be set to a color value based on the one or more rays. In such examples, a set of one or more rays can be traced to each pixel in the image. However, as the number of pixels in an image increases, the computational cost also increases.

In a simple example, when a ray reaches a surface in a computer-generated scene, the ray can separate into one or more additional rays (e.g., reflected, refracted, and shadow rays). For an example with a perfectly specular surface, a reflected ray can be traced in a mirror-reflection direction from a point corresponding to where an incoming ray reaches the surface. The closest object that the reflected ray intersects can be what will be seen in the reflection. For another example, a refracted ray can be traced in a different direction than the reflected ray (e.g., the refracted ray can go into a surface). For another example, a shadow ray can be traced toward each light. If any opaque object is found between the surface and the light, the surface can be in shadow and the light may not illuminate the surface. However, as the number of additional rays increases, the computational costs for ray tracing increases even further. While a few types of rays have been described that affect computational cost of ray tracing, it should be recognized that there can be many other variables that affect computational cost of determining a color of a pixel based on ray tracing.

In some examples, rather than randomly determining which rays to use, a bidirectional reflectance distribution function (brdf) lobe can be used to determine how light is reflected off a surface. In such examples, when a material is more diffuse and less specular, the brdf lobe can be wider, indicating more directions to sample. And when more sampling directions are required, the computations costs for ray tracing increases.

In one illustrative example, an equation for a color value of a pixel can be:

$$c_p = \int_{p_x-\frac{1}{2}}^{p_x+\frac{1}{2}} \int_{p_y-\frac{1}{2}}^{p_y+\frac{1}{2}} \int_{t_0}^{t_1} \int_{-1}^{1} \int_{-1}^{1} \int_{0}^{1} \int_{0}^{1} f(x, y, t, u, v, l_1, l_2) dl_2 dl_1 dv du dt dy dx.$$

In the equation, $c_p$ can be a color of a pixel, the function $f$ $(x, y, t, u, v, l_1, l_2)$ can represent a scene function that is used to identify the color of the pixel, the integrals for $dl_1$ and $dl_2$ can each represent a light source, the integrals $du$ and $dv$ can represent a lens position, the integral $dt$ can represent a time, and the integrals $dx$ and $dy$ can represent a screen position. However, it should be recognized that the equation above is merely an example. An equation for a color value of a pixel can be different (e.g., with more, less, or different integrals).

Figure 1B:
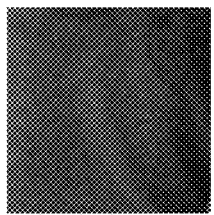
FIG. 1B illustrates an example of an image with noise that was produced using a ray tracer.

To solve the equation recited above, it is obvious that an exact answer would be computationally expensive. Some solutions include sampling each integral (e.g., using Monte Carlo samples or the like). However, depending on the number of samples used, a finished image can include noise (e.g., FIG. 1B). In some examples, noise can be inaccurate variation of brightness or color information in an image.

At least some noise can be removed from the rendered image by post processing. For example, a denoiser (e.g., cross-bilateral or cross non-local means filters) can be applied to a rendered image to remove at least a portion of the noise. However, a denoiser can require tuning one or more parameters (e.g., thresholds to identify similar pixels or the like) and can be slow. In addition, a denoiser typically fails when there are one or more artifacts in the rendered image.

At least some noise can be prevented by using more samples when generating an image. For example, the number of samples needed for a high-quality image can be in the thousands (e.g., 5-10 thousand) on average per pixel. Some pixels can require more samples (more complex areas) and some pixels can require fewer samples (less complex areas (e.g., areas with less detail and/or fewer effects as described in integral above). However, using so many samples can be computationally expensive.

II. Neural Networks

A neural network is a computing system made up of a number of interconnected processing elements (sometimes referred to as nodes). Each processing element may apply a weight, a bias, and/or an activation function to data received by the processing element.

Neural networks are typically organized in layers (e.g., an input layer, one or more hidden layers, and an output layer), each layer including one or more nodes. Nodes that receive data from outside the neural network (i.e., not from nodes of the neural network) can be called input nodes, which can be a part of the input layer. Nodes whose outputs are used externally can be called output nodes, which can be part of the output layer. Data can flow from the input layer to the output layer through one or more hidden layers (each hidden layer with one or more hidden nodes). In some examples, the data can flow through the layers through connections (e.g., weighted connections). For example, the input layer can send the data to a first hidden layer of the one or more hidden layers using a connection.

The first hidden layer can include one or more hidden nodes, each of which can include an activation function (e.g., a linear or non-linear function) that is applied to a sum of the weighted inputs. Examples of activation functions can include a sigmoid function (given by $$\sigma(\gamma) = \frac{1}{1+e^{-\gamma}}),$$

an arc-tangent function (given by $$\sigma(\gamma) = \left(\frac{2}{\pi}\right)$$

arctan($\gamma$)), a hyperbolic-tangent function (given by $$\sigma(\gamma) = \frac{e^\gamma - e^{-\gamma}}{e^\gamma + e^{-\gamma}}),$$

or a rectified linear function (given by $\sigma(\gamma)$=max(0, $\gamma$) or approximated by $\sigma(\gamma)$=ln(1+$e^\gamma$)). In some examples, a final hidden layer of the one or more hidden layers (which can be the first hidden layer or another hidden layer) can send a sum of weighted data to an output layer, which can include one or more output nodes.

Neural networks typically include some form of learning rule, which modify one or more weights of connections between nodes according to data that is presented to the neural network. Although there are many different kinds of learning rules used by neural networks, one example is back propagation. With back propagation, learning can be a supervised process that occurs each time a network is presented with new data through a forward flow of the neural network (commonly referred to as feed forward). Once an output is generated, an error can be calculated based on the output and a ground truth. The ground truth can represent what the output should have been if the neural network was configured correctly. The weights are then updated starting from the output layer and flowing to the input layer to minimize the error (commonly referred to as back propagation). And this process can iterate through the same input and/or multiple different inputs until the error is within a threshold, e.g., less than a specific value or changed by less than a specific value across one or more iterations. After weights have been trained, the neural network can be used on new data that the neural network was not trained on.

There are different ways in which information can be processed by a node, and different ways of connecting the nodes to one another. Different neural network structures (e.g., a multilayer perceptron and a convolutional neural network) can be constructed by using different processing elements and/or connecting the processing elements in different manners.

Figure 2:
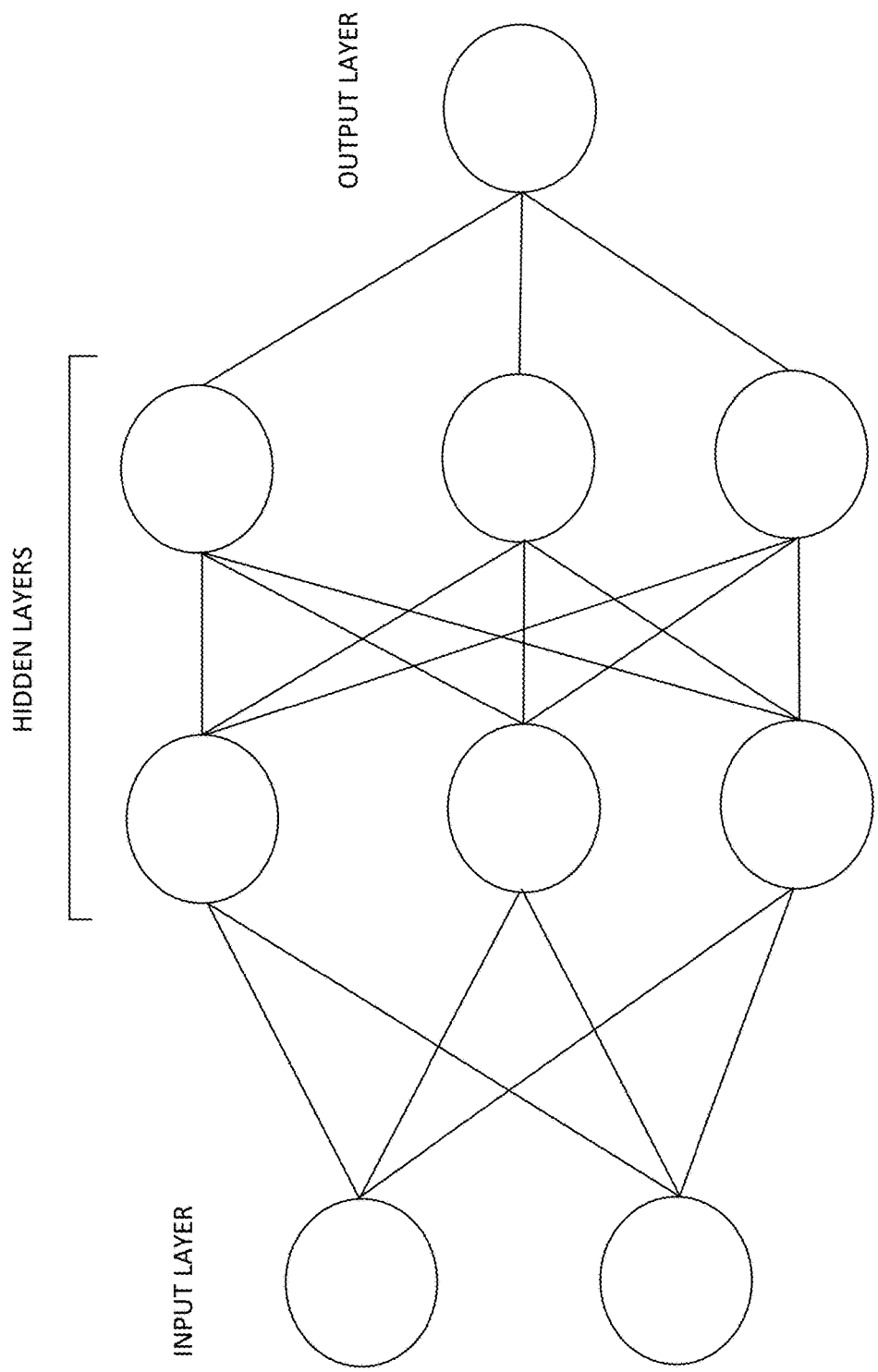
FIG. 2 illustrates an example of a multilayer perceptron.

FIG. 2 illustrates an example of a multilayer perceptron (MLP). As described above generally for neural networks, the MLP can include an input layer, one or more hidden layers, and an output layer. In some examples, adjacent layers in the MLP can be fully connected to one another. For example, each node in a first layer can be connected to each node in a second layer when the second layer is adjacent to the first layer. The MLP can be a feedforward neural network, meaning that data moves from the input layer to the one or more hidden layers to the output layer when receiving new data.

The input layer can include one or more input nodes. The one or more input nodes can each receive data from a source that is remote from the MLP. In some examples, each input node of the one or more input nodes can correspond to a value for a feature of a pixel. Examples of a feature can include a color value of the pixel, a shading normal of the pixel, a depth of the pixel, an albedo of the pixel, or the like. In such examples, if an image (or subimage) is 10 pixels by 10 pixels, the MLP can include 100 input nodes multiplied be the number of features. For example, if color values (e.g., red, green, and blue) and shading normal (e.g., x, y, and z), the MLP can include 600 input nodes (10*10*(3+3)). In some examples, the MLP can operate per pixel (i.e., data at a given pixel can be fed forward). In such examples, there would be 6 (3+3) nodes.

A first hidden layer of the one or more hidden layers can receive data from the input layer. In particular, each hidden node of the first hidden layer can receive data from each node of the input layer (sometimes referred to as being fully connected). The data from each node of the input layer can be weighted based on a learned weight. In some examples, each hidden layer can be fully connected to another hidden layer, meaning that output data from each hidden node of a hidden layer can be input to each hidden node of a subsequent hidden layer. In such examples, the output data from each hidden node of the hidden layer can be weighted based on a learned weight. In some examples, each learned weight of the MLP can be learned independently, such that a first learned weight is not merely a duplicate of a second learned weight.

A number of nodes in a first hidden layer can be different than a number of nodes in a second hidden layer. A number of nodes in a hidden layer can also be different than a number of nodes in the input layer (as illustrated in FIG. 2).

A final hidden layer of the one or more hidden layers can be fully connected to the output layer. In such examples, the final hidden layer can be the first hidden layer or another hidden layer. The output layer can include one or more output nodes. An output node can perform one or more operations described above (e.g., non-linear operations) on data provided to the output node to produce a result to provide to a system remote from the MLP.

Figure 3A:
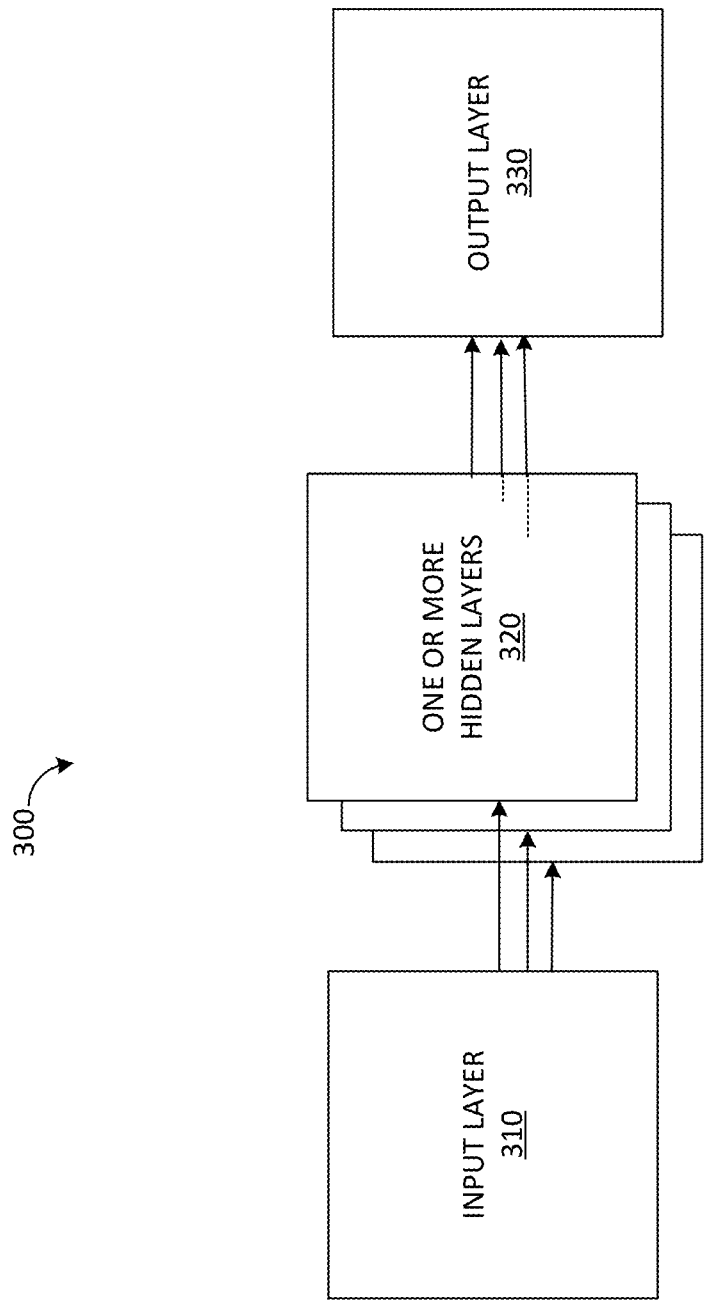
FIGS. 3A-3D illustrate an example of a convolutional neural network.
Figure 3B:
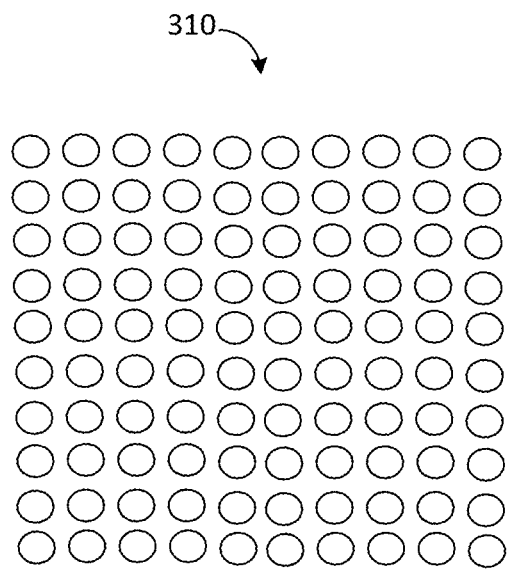

FIG. 3A illustrates an example of a convolutional neural network (CNN) 300, which is a variant of a MLP. The CNN 300 can operate on pixels in a spatial neighborhood, rather than a given pixel as is done with a MLP. The CNN 300 can be specifically designed to operate on images. In some examples, the CNN 300 can include an input layer 310, one or more hidden layers 320 (e.g., a convolutional layer), and an output layer 330. Like the MLP, the input layer 310 can include one or more input nodes, each hidden layer can include one or more hidden nodes, and the output layer can include one or more input nodes. For example, FIG. 3B illustrates an example of a node representation of an input layer 310. Each circle in the input layer 310 can represent nodes that correspond to pixels and their values for a given feature.

In some examples, there can be multiple channels (sometimes referred to as dimensions) for each layer, including the input layer 310, each hidden layer of the one or more hidden layers 320, and the output layer 330. In such examples, each channel can correspond to a different feature. For example, a first channel of the input layer 310 can receive the values for a specific feature for all the pixels in the image (or subimage). Examples of a feature can include a color value (red, green, or blue), a shading normal, a depth, an albedo, or the like.

While the one or more hidden layers 320 are illustrated as one level in FIG. 3A, it should be recognized that hidden layers can be compounding, where a result of a first hidden layer is input to a second hidden layer. And while the one or more hidden layers 320 can be a variety of types, as one skilled in the art will recognize, a convolutional layer will be described below, which is unique to the CNN 300. The convolutional layer can group nodes together to take advantage of certain aspects of images, including that pixels are inherently related to nearby pixels.

The convolutional layer can define a local receptive field. The local receptive field can be an array of weights to be applied to a number of adjacent nodes. For example, the local receptive field can be a 5×5 array. The local receptive field can move around (sometimes referred to as travel) the convolutional layer, applying the array of weights to nodes based on a configuration of the local receptive field (e.g., a step size).

Figure 3C:
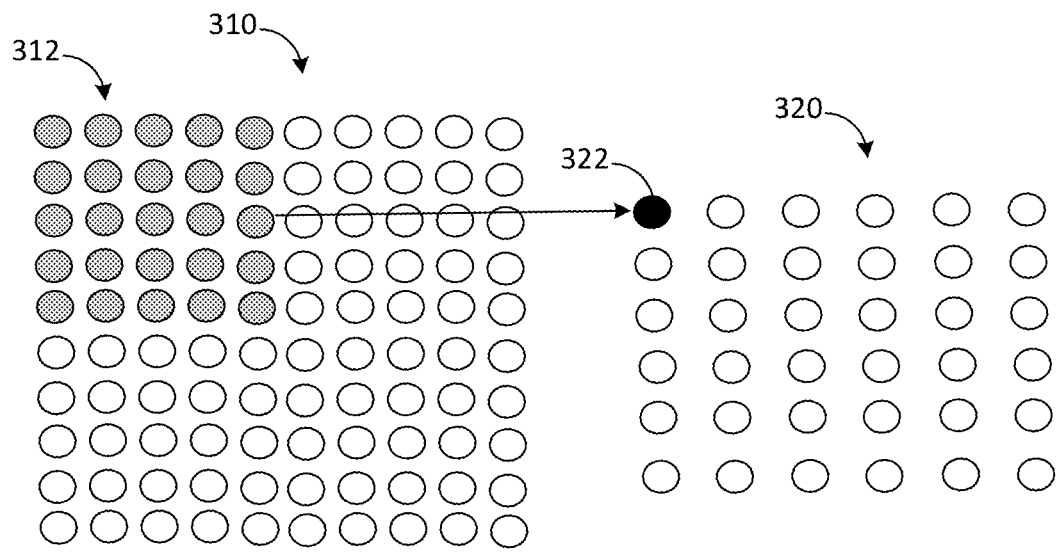

FIG. 3C illustrates an example of a first location 312 for a local receptive field for a layer. While the first location 312 is illustrated at the top left corner of the layer 310, it should be recognized that the first location 312 can be in a different location, including partially outside of the layer 310 where nodes outside of the layer 310 can have a predefined value (e.g., zero).

The local receptive field can include an array of 5×5 weights that were determined for the layer 310. Each weight in each position of the local receptive field can be applied to an underlying node in the first location 312 of the layer 310. The result of the application of the weights can be summed together to result in a first output 332 in a subsequent layer 320. The first output 332 can include summing the result of the application of the weights over each channel of the layer 310. The weights for each channel can be different. In some examples, the local receptive field can also include a bias that is determined for the layer 310. The bias can be applied to the first output 332.

Figure 3D:
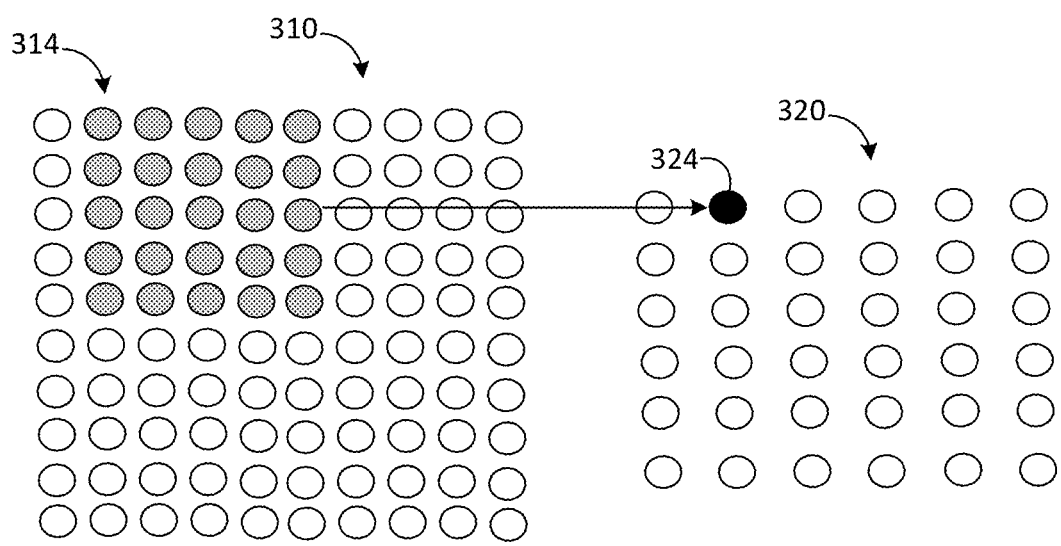

FIG. 3D illustrates an example of a second location 314 for the local receptive field for the layer 310. The second location 314 can be shifted one or more nodes from the first location 312 such that a weight for a top left position of the first location 312 is the same as a weight for a top left position of the second location 314. For example, rather than starting on a first column of nodes of the layer 310, the second location 314 can start on a second column of nodes of the layer 310. In such an example, a result of the local receptive field being applied to the second location 314 can be a second output 324 in the subsequent layer. The second output 324 can be shifted over one spot relative to the first output 322 in the subsequent layer 320. This pattern can continue for each node in the subsequent layer 320 such that each of the nodes in the layer 310 is associated with at least one node in the subsequent layer 320. In addition, the bias that was used for the first location 312 can also be used for the second location 314.

If there are multiple channels of the layer 310, other local receptive fields, each with the same size as the local receptive field, can be applied to each other channel of the layer 310. The other local receptive fields can have the same and/or different weights and/or bias.

In some examples, an activation function (as described above for the MLP) can be applied to each node of each hidden layer of the CNN 300 (e.g., potentially a different activation function for each hidden layer, or at least different parameters of a same type of activation function).

It should be recognized that other types of hidden layers (other than a convolutional layer) can be included in the CNN 300. The result of the CNN 300 can be an output image.

III. De-Noising Using Neural Networks

A neural network, as described above, can be used to efficiently remove noise from an image generated by a ray tracer. For example, the neural network can receive raw data from the ray tracer. The raw data can include values for pixel information, such as color, shading normal, depth, albedo, or the like. In some examples, the raw data can be from an image and/or a computer-generated scene. In such examples, pixel information (such as color) can be identified from the image, and pixel information (such as shading normal, depth, and albedo) can be identified from the computer-generated scene. However, it should be recognized that pixel information can be identified in other ways and more or less pixel information can be included in the raw data. In other examples, the neural network can receive one or more image gradients as input. The neural network can process the raw data (or the one or more image gradients) to output an image with at least a portion of noise removed. In some examples, the image can be in the form of color values. In other examples, the image can be in the form of one or more image gradients that can be used to generate a final image.

The neural network can be trained to remove noise from images. The training can include having the neural network process multiple noisy images. For each noisy image, the output of the neural network can be compared to a corresponding ground truth. The corresponding ground truth can be a refined version of a noisy image, with at least a portion of noise from the noisy image removed. In some examples, the corresponding ground truth can be generated by applying one or more denoisers to a corresponding noisy image. In other examples, the corresponding ground truth can be generated by using more samples from a ray tracer than were used to generate the corresponding noisy image. In other examples, the corresponding ground truth can be one or more image gradients, which can be compared to one or more image gradients when image gradients are output by the neural network. Based on the comparison with the corresponding ground truth, one or more weights associated with the neural network can be updated. In particular, an iterative process can be performed where an error of a set of weights of the neural network is minimized through back propagation using gradient descent for each noisy image.

In some examples, the output of the neural network can either be an image or one or more image gradients. In such examples, an image gradient can be a directional change in intensity or color in an image. If one or more image gradients are the output, an additional reconstruction step can be performed to generate a final image. For example, the final image can be constructed from the one or more image gradients by solving a Poisson reconstruction, and the error can then be computed on the final color image for back propagation.

A. Example Neural Network for Processing Images

Figure 4:
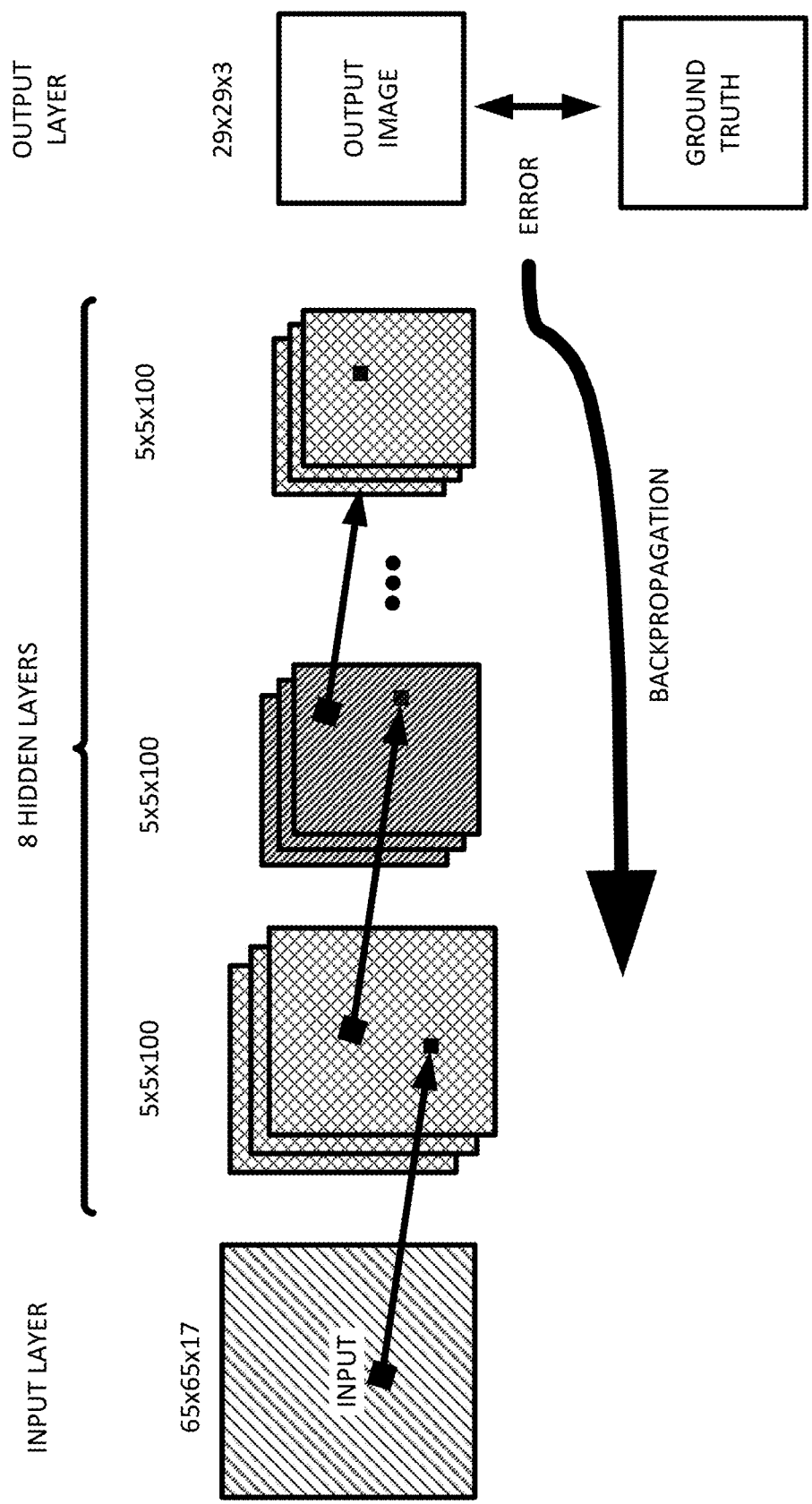
FIG. 4 illustrates an example of a neural network for removing noise from an image.
Figure 5A:
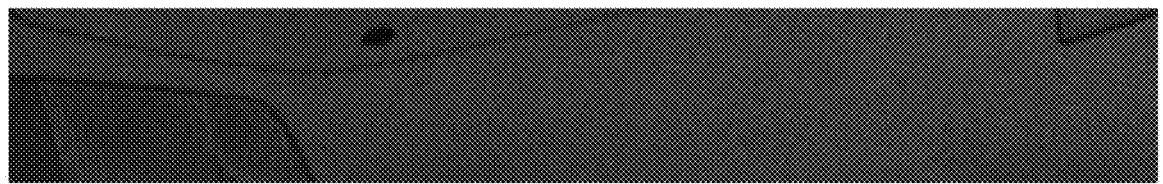
FIG. 5A illustrates an example of a noisy image.
Figure 5B:
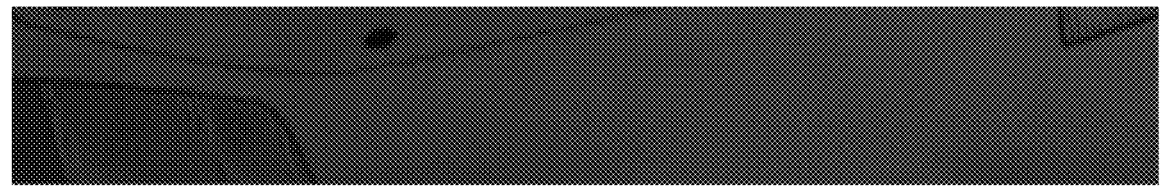
FIG. 5B illustrates an example of an output image of a neural network described herein.

FIG. 4 illustrates an example of a neural network 400 for removing noise from an image. While the neural network 400 is a CNN, it should be recognized that the neural network 400 could be another type of neural network (e.g., an MLP). The neural network 400 can include an input layer that includes multiple input nodes. In some examples, the multiple input nodes can include values of one or more features for a portion of an image (sometimes referred to as a subimage). In such examples, a subimage can be used to reduce the computational cost of training the neural network while still allowing the neural network to be trained to reduce noise.

In one illustrative example, the subimage can be 65 pixels by 65 pixels; however, it should be recognized that the subimage can be any size. The raw data of the subimage can include values of one or more features (e.g., color, shading normal, depth, albedo, illumination, variance of any feature, or the like of a pixel). Variance can be a measure of a degree of consistency of rays traced through a pixel. For example, if all rays return the same value, a variance for the pixel can be 0. For another example, if all rays return very different values, a variance for the pixel can be large.

In some examples, values for a feature can be normalized as compared to other features. A feature can be represented by more than one value. For example, a color of a pixel can be represented by a red value, a green value, and a blue value. As another example, a shading normal can be represented by an x value, a y value, and a z value. Similarly, other features can be represented by more than one value. The neural network 400 indicates that the input layer is a size of 65×65×17, which indicates each subimage is 65 pixels by 65 pixels and there are 17 values for each pixel.

The neural network 400 can further include one or more hidden layers. For illustration only, the neural network 400 can include 8 hidden layers. However, it should be recognized that there can be more or fewer hidden layers. If the neural network 400 is a CNN, each layer can be associated with a local receptive field and/or a number of nodes. The local receptive field can indicate a number of pixels around a pixel to be used when analyzing the pixel. The neural network 400 is illustrated as each hidden convolutional layer having a 5×5 local receptive field and 100 nodes. The 100 nodes can indicate that there are 100 values per pixel at this stage. In one illustrative example, entering the neural network 100, there may be 17 values per pixel (e.g., red-green-blue (rgb) color, xyz normal, depth, etc.). At a first hidden layer, 100 values per pixel can be computed by applying one or more neural network computations on the input values. In some examples, each hidden convolutional layer can correspond to a different feature. The local receptive field being 5×5 indicates that weights of the CNN can be applied in a convolution operation for two neighboring pixels in each direction.

The neural network 400 further includes an output layer. The output layer can include one or more output nodes that represent an output of the neural network 400. In some examples, the output of the neural network can be an image in a color space (e.g., RGB). In such examples, the output can be a height and width of the image multiplied by the number of color channels. In one illustrative example, an output of the neural network 400 can be 29×29×3, where the image is 29 pixels by 29 pixels and there are three color channels (e.g., RGB). The reduced size of the output can be due to applying a convolution kernel to the input image.

When training, the output image can be compared to a refined image. In some examples, the refined image can be generated by a ray tracer using more samples than the noisy image used to generate the output image. In other examples, the refined image can be generated by applying a denoiser (e.g., a join non-local mean filter) to the noisy image.

In some examples, the output image can be compared to the refined image by computing an error between the images. For example, the output image can be compared to the refined image by calculating a norm of a vector between the output image and the refined image, where each element of the vector is a difference between corresponding pixel values (e.g., color or intensity) of corresponding pixels in the two images. This difference vector can provide an error distance between the two images. There are several ways to compute the norm of such a difference vector. For example, the norm can be a one-norm (also known as the $L_1$ norm), which is defined as the sum of the absolute values of its components. An example L1 error equation is $$E = \frac{1}{NM} \sum_i^N \sum_j^M |p_{ij} - q_{ij}|.$$

In the error equation, N can be a number of training subimages, M can be a size of a subimage, p can be a network output illumination, and q can be a refined image illumination. For another example, the norm can be a two-norm (also known as the $L_2$ norm), which is defined as the square root of the sum of the squares of the differences of its components. An example L2 error equation is $$E = \sqrt{\frac{1}{NM} \sum_i^N \sum_j^M (p_{ij} - q_{ij})^2}.$$

It should be recognized that other techniques for calculating a difference vector (and its size) between the output image and the refined image can be used.

Based on the difference between the refined image and the output image, a back-propagation process can be executed through the neural network 400 to update weights to better generate the output image. In some examples, the back propagation can begin at weights near the end of the neural network 400 and proceed to the beginning. In some examples, the neural network 400 can be trained first using noisy images generated using a first number of samples (e.g., 128 samples). In such examples, the neural network 400 can be trained second with a second number of samples (e.g., 32). The second number of samples may be lower than the first number of sample. The second training can be used to refine the weights with a different sampling rate.

B. Method for Reducing Noise

Figure 6:
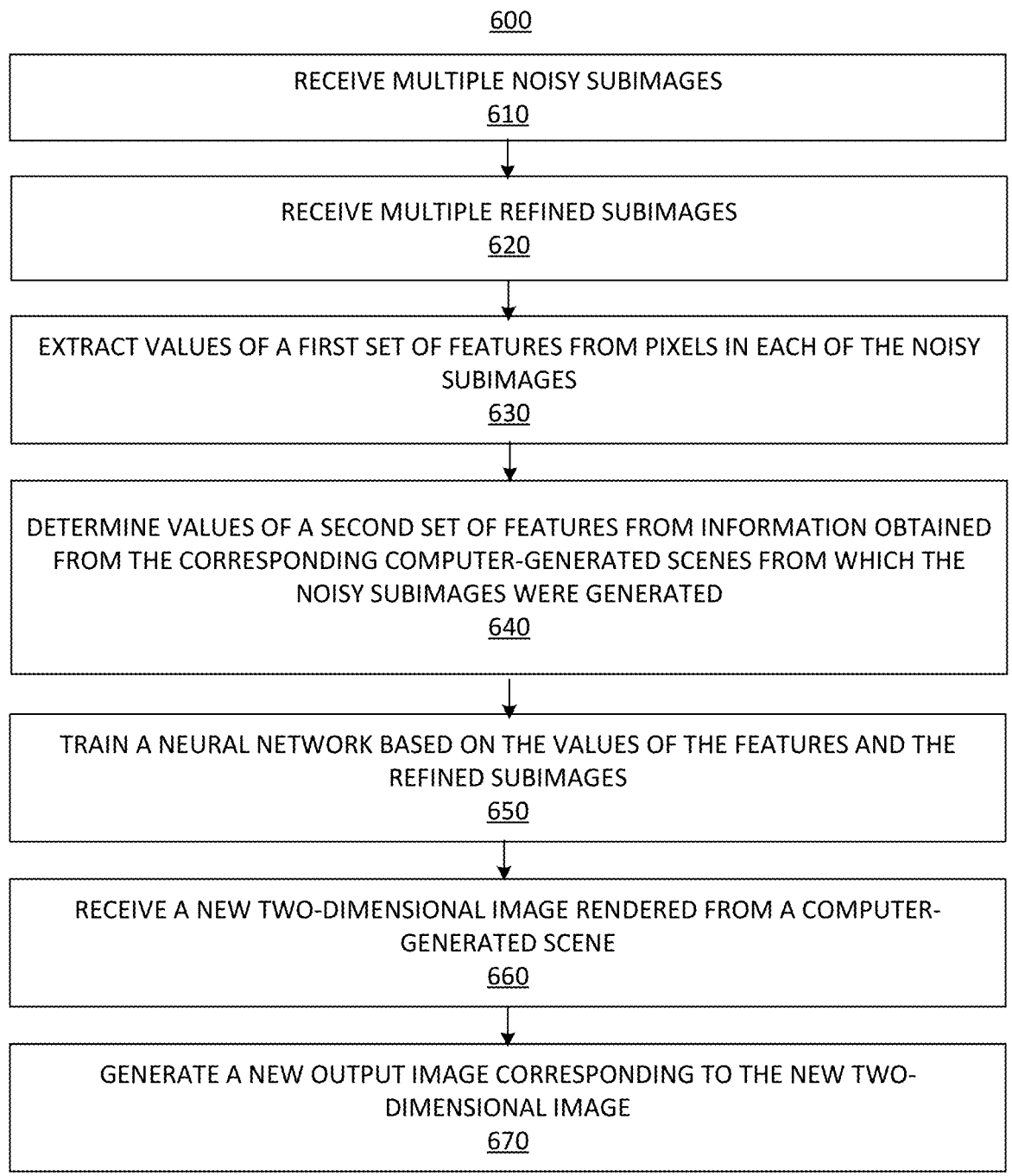
FIG. 6 is a flowchart illustrating an embodiment of a process for reducing noise in a two-dimensional image.

FIG. 6 is a flowchart illustrating an embodiment of a process 600 for reducing noise in a two-dimensional image. In some aspects, the process 600 can be performed by a computing device.

Process 600 is illustrated as a logical flow diagram, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 600 can be performed under the control of one or more computer systems configured with executable instructions and can be implemented as code (e.g., executable instructions, one or more computer programs, or one or more applications) executing collectively on one or more processors, by hardware, or combinations thereof. As noted above, the code can be stored on a machine-readable storage medium, for example, in the form of a computer program comprising a plurality of instructions executable by one or more processors. The machine-readable storage medium can be non-transitory.

The process 600 can begin at 610 where multiple noisy subimages are received. The multiple noisy subimages can be received after being generated by a ray tracer. In addition, each of the multiple noisy subimages can be rendered using a respective set of rays in a corresponding computer-generated scene. In some examples, entire images can be rendered, rather than subimages (i.e., at least a portion of an image). A first noisy subimage of the plurality of noisy subimages can be rendered using a respective set of rays corresponding to a first computer-generated scene, and a second noisy subimage of the plurality of noisy subimages can be rendered using a respective different set of rays for a different set of pixels corresponding to the first computer-generated scene.

At 620, multiple refined subimages can also be received. Each refined subimage can correspond to a noisy subimage of the multiple subimages. Each refined subimage can also be generated using the computer-generated scene that the corresponding noisy subimage was rendered from. A refined subimage can have reduced noise relative (or as compared to) a corresponding noisy subimage. A refined subimage is generated using more rays than a corresponding noisy subimage. In some examples, a refined subimage can be a processed version of a corresponding noisy subimage. In such examples, the processing can include removing at least a portion of noise from the corresponding noisy subimage using a denoiser (e.g., a filter).

At 630, values of a first set of features can be extracted from pixels in each of the multiple noisy subimages. Examples of a first set of features include color values (red, green, and blue) and illumination values. At 640, values of a second set of features can be determined from information obtained from the corresponding computer-generated scenes from which the multiple noisy images were generated. Examples of a second set of features include shading normal, depth, albedo, or the like.

At 650, a neural network can be trained based on the values of the features (i.e., the first set and the second set of features) and the multiple refined subimages. In some examples, the neural network can output pixel values of an output subimage. In other examples, the neural network can output gradients of pixels, which can be converted into the output subimage. In either set of examples, the training can include generating an output subimage corresponding to a noisy subimage using the neural network. The output subimage can be compared to a refined subimage that corresponds to the noisy subimage. In some examples, comparing the output subimage to the refined subimage that corresponds to the noisy subimage can include calculating a norm of a difference vector between pixel values of the output subimage and pixel values of the refined subimage. And training can also include modifying one or more parameters of the neural network based on the comparison. The one or more parameters that are modified can include one or more weights that were determined by the neural network.

At 660, a new two-dimensional image can be received. The new two-dimensional image can be rendered from a computer-generated scene. The computer-generated scene can be the same or different computer-generated scene used to train the neural network. Then, at 670, a new output image corresponding to the new two-dimensional noisy image can be generated using the neural network after training.

In some examples, the neural network described in FIG. 6 can be a first neural network. In such examples, the first set of features can include an illumination of pixels of a noisy subimage. When the first set of features includes the illumination, the first neural network can be trained based on a first light path (e.g., specular light transport of the pixels of the noisy images). In addition, a second neural network can be trained based on a second light path (e.g., diffuse light transport of the pixels of the noisy image). Output of the first neural network and the second neural network can be combined to generate the new output image. In some examples, the diffuse light transport of the pixels can be divided by an albedo of the pixels before being trained using the second neural network.

C. Example Using Multiple Neural Networks

Figure 7:
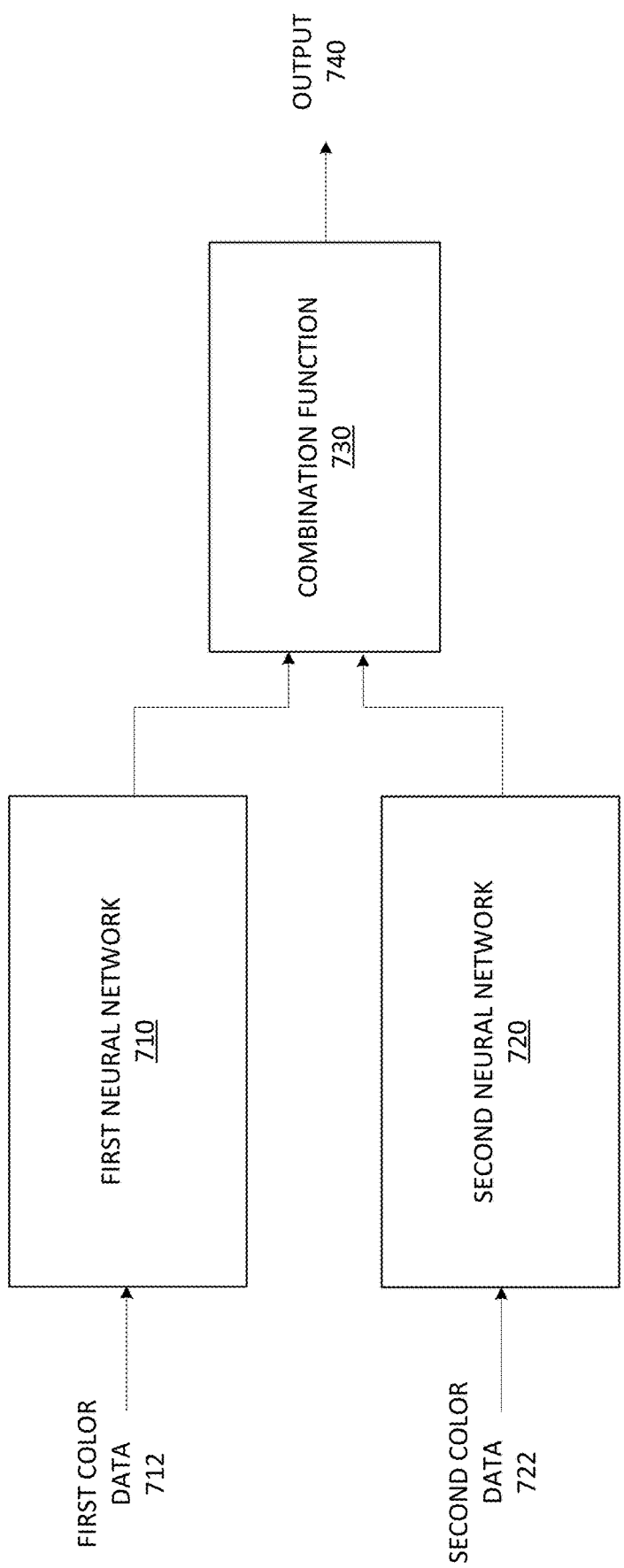
FIG. 7 illustrates an example of using multiple neural networks to reduce noise in a two-dimensional image.

FIG. 7 illustrates an example of using multiple neural networks to reduce noise in a two-dimensional image. In such an example, images generated in different ways can be used for input to each of the multiple neural networks. For example, an image produced with diffuse light transport can be used for a first neural network, and an image produced with specular light transport can be used for a second neural network. Other types of divisions between light paths can be used for each neural network, such as method for determining light paths (e.g., brdf v. light sampling), refracted light paths v. reflected light paths, direct lighting v. indirect lighting, the like, or any combination thereof. In other words, different types of light rays can be used for producing different types of images, which can be used as input. Creating images produced with different kinds of light is possible because of access to the ray tracer used for a computer-generated scene.

In some examples, a first neural network 710 can receive color data (sometimes referred to as pixel data) that is generated with a first type of light ray (illustrated as first color data 712 in FIG. 7) (e.g., diffuse light transport). The first color data 712 can be produced by a ray tracer generating an image with the first type of light ray. In some examples, the first color data 712 can be produced using only the first type of light ray (i.e., not a second type of light ray). For example, rays used in a ray tracer can be tagged as diffuse, specular, or some combination in between. This tagging can be determined by material properties of an object hit by a ray from a camera. For example, a diffuse portion of a light can include ray paths that started at the camera, hit the object (and only calculate the "diffuse" material response for the object), and then made it to a light. These paths would typically be specified as "CD{*}L," which stands for camera, diffuse interaction, then zero or more interactions (i.e., *) and finally a light source. Accordingly, the first color data 712 can be generated by ignoring all material response at a first hit of an object except a diffuse portion.

A second neural network 720 can receive color data that is generated with a second type of light ray (illustrated as second color data 722 in FIG. 7) (e.g., specular light transport). The second color data 722 can be produced by a ray tracer generating an image with the second type of light ray. In some examples, the second color data 722 can be produced using only the second type of light ray (i.e., not the first type of light ray). Similarly, a specular portion of a light can include ray paths that started at the camera, hit an object (and only calculated the "specular" material response for the object), and then made it to a light. These paths would typically be specified as "CS{*}L."

Other examples of types of light that can be generated include refraction (e.g., "CT{*}L," where T is transmission), direct diffuse lighting (e.g., "CDL"), indirect diffuse lighting (e.g., "CD{+}L," where + means one or more), or the like. Separating an image into any/all of the light transports described herein may be useful for denoising.

In examples with the first neural network 710 is based on specular light transport, an output can be an image with just specular light transport. In examples with the second neural network 720 is based on diffuse light transport, an output can be an image with just diffuse light transport. While examples using multiple neural networks described above use color, it should be recognized that other information, in addition to color, can be used for the multiple neural networks, such as shading normal, depth, albedo, or the like.

A first output of the first neural network 710 and a second output of the second neural network 720 can be used as input to a combination function 730. The combination function 730 can combine the first output and the second output to generate a final image, the final image generated either directly or through reconstruction using a gradient. Accordingly, the combination function 730 can invert one or more computations performed on the input of the neural networks (e.g., how the input was split and/or preprocessed). In one illustrative example, data generated based on diffuse light transport can be divided by albedo. To invert the data by the combination function 730, the data can be multiplied by albedo. In some embodiments, an error for the first neural network 710 and/or the second neural network 720 can be calculated on the gradients rather than reconstructed final images.

In examples with multiple neural networks, each neural network can be initially trained separately. In such examples, there would be a diffuse error for a neural network associated with diffuse light transport and a specular error for a neural network associated with specular light transport. After initially training, the neural networks can be put together and trained as a single neural network with the error calculated on the final image.

In some examples, color data that is generated based on a type of light ray (e.g., diffuse light transport) can be divided by albedo. In particular, a diffuse component of a color of a point on a surface can be computed by multiplying an albedo of the surface by a magnitude of an incident light (i.e., the irradiance). The albedo of a highly patterned surface has high spatial frequency, and is therefore difficult to filter. The irradiance on the other hand often has low spatial frequency, and is therefore easier to filter. By dividing by albedo, the irradiance can be isolated and denoised using a neural network. Once denoised, the denoised irradiance can be multiplied by the albedo to recover the diffuse color. In some examples, an epsilon can be added to the albedo when dividing and multiplying by the albedo to avoid division by zero. Dividing the color data by the albedo tends to make training easier since denoising the illumination is more straightforward and forgiving.

For another example, different sampling patterns can be used for each neural network. Sampling patterns can identify which rays to sample. For example, a light sampling technique that focuses on one or more bright lights can be used. For another example, bidirectional reflectance distribution function sampling technique can be used, which focuses on material reflectance.

IV. Example Systems

Figure 8:
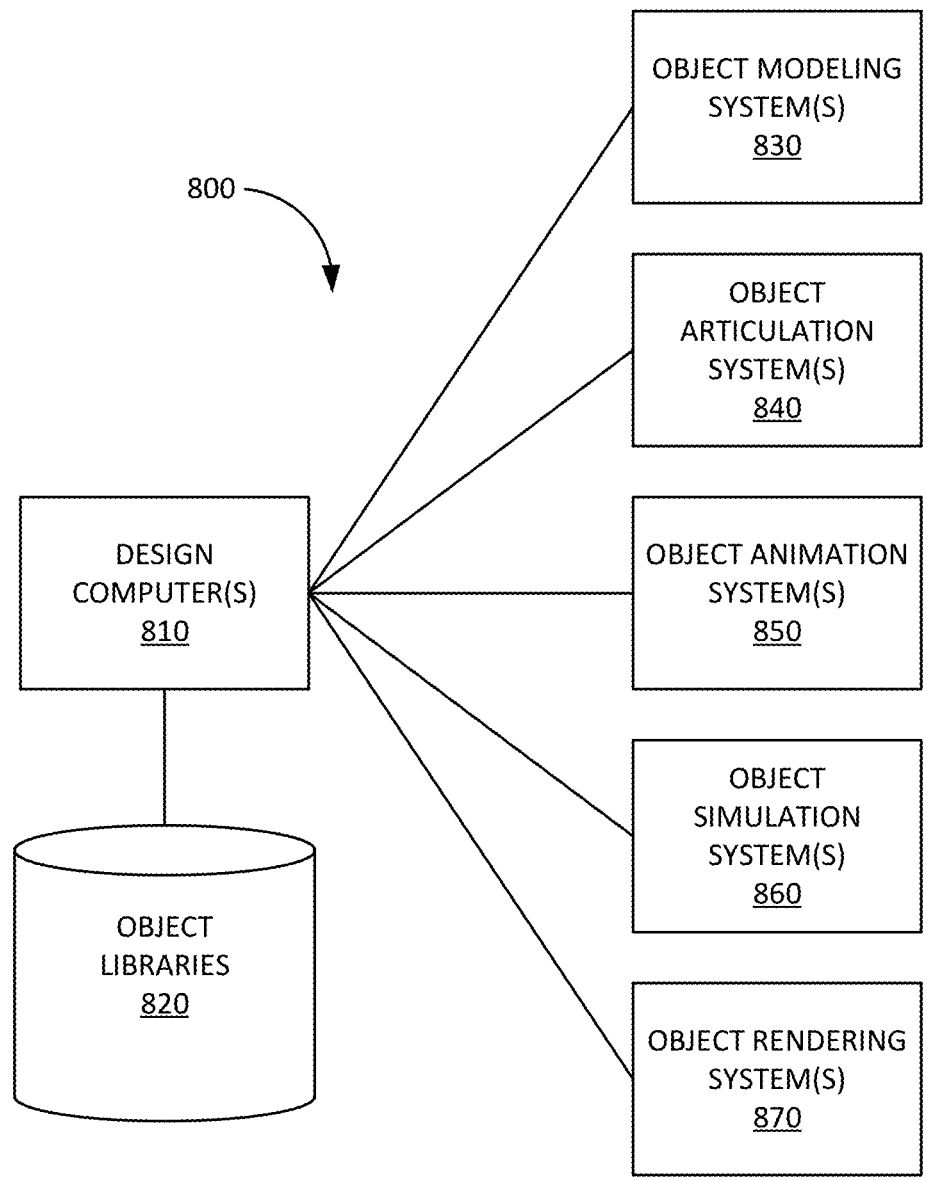
FIG. 8 is a simplified block diagram of system for creating computer graphics imagery (CGI) and computer-aided animation that may implement or incorporate various embodiments.

FIG. 8 is a simplified block diagram of system 800 for creating computer graphics imagery (CGI) and computer-aided animation that may implement or incorporate various embodiments. In this example, system 800 can include one or more design computers 810, object library 820, one or more object modeler systems 830, one or more object articulation systems 840, one or more object animation systems 850, one or more object simulation systems 860, and one or more object rendering systems 870. Any of the systems 830-870 may be invoked by or used directly by a user of the one or more design computers 810 and/or automatically invoked by or used by one or more processes associated with the one or more design computers 810. Any of the elements of system 800 can include hardware and/or software elements configured for specific functions.

The one or more design computers 810 can include hardware and software elements configured for designing CGI and assisting with computer-aided animation. Each of the one or more design computers 810 may be embodied as a single computing device or a set of one or more computing devices. Some examples of computing devices are PCs, laptops, workstations, mainframes, cluster computing system, grid computing systems, cloud computing systems, embedded devices, computer graphics devices, gaming devices and consoles, consumer electronic devices having programmable processors, or the like. The one or more design computers 810 may be used at various stages of a production process (e.g., pre-production, designing, creating, editing, simulating, animating, rendering, post-production, etc.) to produce images, image sequences, motion pictures, video, audio, or associated effects related to CGI and animation.

In one example, a user of the one or more design computers 810 acting as a modeler may employ one or more systems or tools to design, create, or modify objects within a computer-generated scene. The modeler may use modeling software to sculpt and refine a neutral 3D model to fit predefined aesthetic needs of one or more character designers. The modeler may design and maintain a modeling topology conducive to a storyboarded range of deformations. In another example, a user of the one or more design computers 810 acting as an articulator may employ one or more systems or tools to design, create, or modify controls or animation variables (avars) of models. In general, rigging is a process of giving an object, such as a character model, controls for movement, therein "articulating" its ranges of motion. The articulator may work closely with one or more animators in rig building to provide and refine an articulation of the full range of expressions and body movement needed to support a character's acting range in an animation. In a further example, a user of design computer 810 acting as an animator may employ one or more systems or tools to specify motion and position of one or more objects over time to produce an animation.

Object library 820 can include elements configured for storing and accessing information related to objects used by the one or more design computers 810 during the various stages of a production process to produce CGI and animation. Some examples of object library 820 can include a file, a database, or other storage devices and mechanisms. Object library 820 may be locally accessible to the one or more design computers 810 or hosted by one or more external computer systems.

Some examples of information stored in object library 820 can include an object itself, metadata, object geometry, object topology, rigging, control data, animation data, animation cues, simulation data, texture data, lighting data, shader code, or the like. An object stored in object library 820 can include any entity that has an n-dimensional (e.g., 2D or 3D) surface geometry. The shape of the object can include a set of points or locations in space (e.g., object space) that make up the object's surface. Topology of an object can include the connectivity of the surface of the object (e.g., the genus or number of holes in an object) or the vertex/edge/face connectivity of an object.

The one or more object modeling systems 830 can include hardware and/or software elements configured for modeling one or more objects. Modeling can include the creating, sculpting, and editing of an object. In various embodiments, the one or more object modeling systems 830 may be configured to generate a model to include a description of the shape of an object. The one or more object modeling systems 830 can be configured to facilitate the creation and/or editing of features, such as non-uniform rational B-splines or NURBS, polygons and subdivision surfaces (or SubDivs), that may be used to describe the shape of an object. In general, polygons are a widely used model medium due to their relative stability and functionality. Polygons can also act as the bridge between NURBS and SubDivs. NURBS are used mainly for their ready-smooth appearance and generally respond well to deformations. SubDivs are a combination of both NURBS and polygons representing a smooth surface via the specification of a coarser piecewise linear polygon mesh. A single object may have several different models that describe its shape.

The one or more object modeling systems 830 may further generate model data (e.g., 2D and 3D model data) for use by other elements of system 800 or that can be stored in object library 820. The one or more object modeling systems 830 may be configured to allow a user to associate additional information, metadata, color, lighting, rigging, controls, or the like, with all or a portion of the generated model data.

The one or more object articulation systems 840 can include hardware and/or software elements configured to articulating one or more computer-generated objects. Articulation can include the building or creation of rigs, the rigging of an object, and the editing of rigging. In various embodiments, the one or more articulation systems 840 can be configured to enable the specification of rigging for an object, such as for internal skeletal structures or eternal features, and to define how input motion deforms the object. One technique is called "skeletal animation," in which a character can be represented in at least two parts: a surface representation used to draw the character (called the skin) and a hierarchical set of bones used for animation (called the skeleton).

The one or more object articulation systems 840 may further generate articulation data (e.g., data associated with controls or animations variables) for use by other elements of system 800 or that can be stored in object library 820. The one or more object articulation systems 840 may be configured to allow a user to associate additional information, metadata, color, lighting, rigging, controls, or the like, with all or a portion of the generated articulation data.

The one or more object animation systems 850 can include hardware and/or software elements configured for animating one or more computer-generated objects. Animation can include the specification of motion and position of an object over time. The one or more object animation systems 850 may be invoked by or used directly by a user of the one or more design computers 810 and/or automatically invoked by or used by one or more processes associated with the one or more design computers 810.

In various embodiments, the one or more animation systems 850 may be configured to enable users to manipulate controls or animation variables or utilized character rigging to specify one or more key frames of animation sequence. The one or more animation systems 850 generate intermediary frames based on the one or more key frames. In some embodiments, the one or more animation systems 850 may be configured to enable users to specify animation cues, paths, or the like according to one or more predefined sequences. The one or more animation systems 850 generate frames of the animation based on the animation cues or paths. In further embodiments, the one or more animation systems 850 may be configured to enable users to define animations using one or more animation languages, morphs, deformations, or the like.

The one or more object animation systems 850 may further generate animation data (e.g., inputs associated with controls or animation variables) for use by other elements of system 800 or that can be stored in object library 820. The one or more object animation systems 850 may be configured to allow a user to associate additional information, metadata, color, lighting, rigging, controls, or the like, with all or a portion of the generated animation data.

The one or more object simulation systems 860 can include hardware and/or software elements configured for simulating one or more computer-generated objects. Simulation can include determining motion and position of an object over time in response to one or more simulated forces or conditions. The one or more object simulation systems 860 may be invoked by or used directly by a user of the one or more design computers 810 and/or automatically invoked by or used by one or more processes associated with the one or more design computers 810.

In various embodiments, the one or more object simulation systems 860 may be configured to enables users to create, define, or edit simulation engines, such as a physics engine or physics processing unit (PPU/GPGPU) using one or more physically-based numerical techniques. In general, a physics engine can include a computer program that simulates one or more physics models (e.g., a Newtonian physics model), using variables such as mass, velocity, friction, wind resistance, or the like. The physics engine may simulate and predict effects under different conditions that would approximate what happens to an object according to the physics model. The one or more object simulation systems 860 may be used to simulate the behavior of objects, such as hair, fur, and cloth, in response to a physics model and/or animation of one or more characters and objects within a computer-generated scene.

The one or more object simulation systems 860 may further generate simulation data (e.g., motion and position of an object over time) for use by other elements of system 800 or that can be stored in object library 820. The generated simulation data may be combined with or used in addition to animation data generated by the one or more object animation systems 850. The one or more object simulation systems 860 may be configured to allow a user to associate additional information, metadata, color, lighting, rigging, controls, or the like, with all or a portion of the generated simulation data.

The one or more object rendering systems 870 can include hardware and/or software element configured for "rendering" or generating one or more images of one or more computer-generated objects. "Rendering" can include generating an image from a model based on information such as geometry, viewpoint, texture, lighting, and shading information. The one or more object rendering systems 870 may be invoked by or used directly by a user of the one or more design computers 810 and/or automatically invoked by or used by one or more processes associated with the one or more design computers 810. One example of a software program embodied as the one or more object rendering systems 870 can include PhotoRealistic RenderMan, or PRMan, produced by Pixar Animations Studios of Emeryville, Calif.

In various embodiments, the one or more object rendering systems 870 can be configured to render one or more objects to produce one or more computer-generated images or a set of images over time that provide an animation. The one or more object rendering systems 870 may generate digital images or raster graphics images.

In various embodiments, a rendered image can be understood in terms of a number of visible features. Some examples of visible features that may be considered by the one or more object rendering systems 870 may include shading (e.g., techniques relating to how the color and brightness of a surface varies with lighting), texture-mapping (e.g., techniques relating to applying detail information to surfaces or objects using maps), bump-mapping (e.g., techniques relating to simulating small-scale bumpiness on surfaces), fog/participating medium (e.g., techniques relating to how light dims when passing through non-clear atmosphere or air), shadows (e.g., techniques relating to effects of obstructing light), soft shadows (e.g., techniques relating to varying darkness caused by partially obscured light sources), reflection (e.g., techniques relating to mirror-like or highly glossy reflection), transparency or opacity (e.g., techniques relating to sharp transmissions of light through solid objects), translucency (e.g., techniques relating to highly scattered transmissions of light through solid objects), refraction (e.g., techniques relating to bending of light associated with transparency), diffraction (e.g., techniques relating to bending, spreading and interference of light passing by an object or aperture that disrupts the ray), indirect illumination (e.g., techniques relating to surfaces illuminated by light reflected off other surfaces, rather than directly from a light source, also known as global illumination), caustics (e.g., a form of indirect illumination with techniques relating to reflections of light off a shiny object, or focusing of light through a transparent object, to produce bright highlights on another object), depth of field (e.g., techniques relating to how objects appear blurry or out of focus when too far in front of or behind a focal plane), motion blur (e.g., techniques relating to how objects appear blurry due to high-speed motion, or the motion of the camera), non-photorealistic rendering (e.g., techniques relating to rendering of scenes in an artistic style, intended to look like a painting or drawing), or the like.

The one or more object rendering systems 870 may further render images (e.g., motion and position of an object over time) for use by other elements of system 800 or that can be stored in object library 820. The one or more object rendering systems 870 may be configured to allow a user to associate additional information or metadata with all or a portion of the rendered image.

Figure 9:
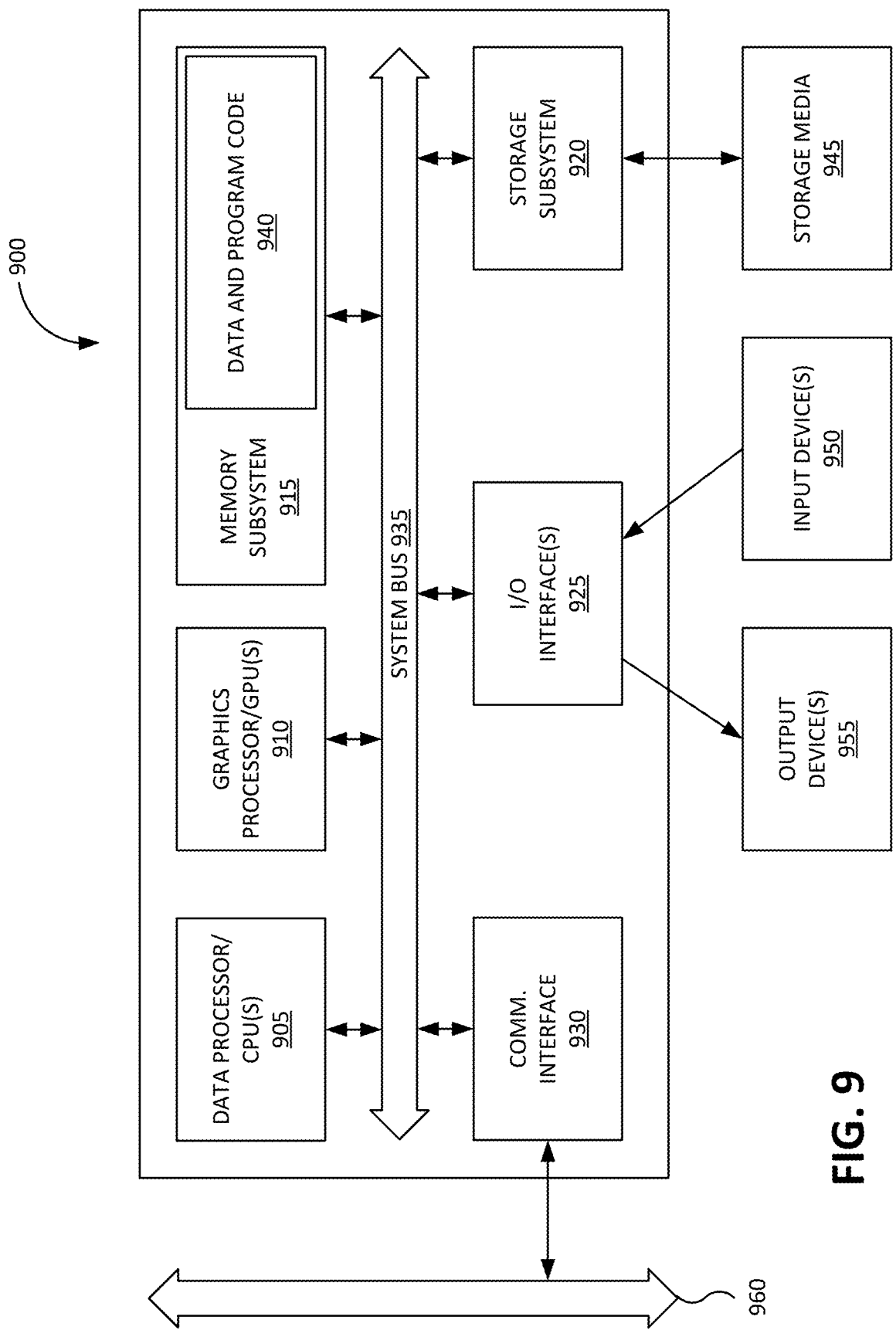
FIG. 9 is a block diagram of computer system.

FIG. 9 is a block diagram of computer system 900. FIG. 9 is merely illustrative. In some embodiments, a computer system includes a single computer apparatus, where the subsystems can be the components of the computer apparatus. In other embodiments, a computer system can include multiple computer apparatuses, each being a subsystem, with internal components. Computer system 900 and any of its components or subsystems can include hardware and/or software elements configured for performing methods described herein.

Computer system 900 may include familiar computer components, such as one or more data processors or central processing units (CPUs) 905, one or more graphics processors or graphical processing units (GPUs) 910, memory subsystem 915, storage subsystem 920, one or more input/output (I/O) interfaces 925, communications interface 930, or the like. Computer system 900 can include system bus 935 interconnecting the above components and providing functionality, such connectivity as inter-device communication.

The one or more data processors or central processing units (CPUs) 905 can execute logic or program code or for providing application-specific functionality. Some examples of CPU(s) 905 can include one or more microprocessors (e.g., single core and multi-core) or micro-controllers, one or more field-gate programmable arrays (FPGAs), and application-specific integrated circuits (ASICs). As user herein, a processor includes a multi-core processor on a same integrated chip, or multiple processing units on a single circuit board or networked.

The one or more graphics processor or graphical processing units (GPUs) 910 can execute logic or program code associated with graphics or for providing graphics-specific functionality. GPUs 910 may include any conventional graphics processing unit, such as those provided by conventional video cards. In various embodiments, GPUs 910 may include one or more vector or parallel processing units. These GPUs may be user programmable, and include hardware elements for encoding/decoding specific types of data (e.g., video data) or for accelerating 2D or 3D drawing operations, texturing operations, shading operations, or the like. The one or more graphics processors or graphical processing units (GPUs) 910 may include any number of registers, logic units, arithmetic units, caches, memory interfaces, or the like.

Memory subsystem 915 can store information, e.g., using machine-readable articles, information storage devices, or computer-readable storage media. Some examples can include random access memories (RAM), read-only-memories (ROMS), volatile memories, non-volatile memories, and other semiconductor memories. Memory subsystem 915 can include data and program code 940.

Storage subsystem 920 can also store information using machine-readable articles, information storage devices, or computer-readable storage media. Storage subsystem 920 may store information using storage media 945. Some examples of storage media 945 used by storage subsystem 920 can include floppy disks, hard disks, optical storage media such as CD-ROMS, DVDs and bar codes, removable storage devices, networked storage devices, or the like. In some embodiments, all or part of data and program code 940 may be stored using storage subsystem 920.

The one or more input/output (I/O) interfaces 925 can perform I/O operations. One or more input devices 950 and/or one or more output devices 955 may be communicatively coupled to the one or more I/O interfaces 925. The one or more input devices 950 can receive information from one or more sources for computer system 900. Some examples of the one or more input devices 950 may include a computer mouse, a trackball, a track pad, a joystick, a wireless remote, a drawing tablet, a voice command system, an eye tracking system, external storage systems, a monitor appropriately configured as a touch screen, a communications interface appropriately configured as a transceiver, or the like. In various embodiments, the one or more input devices 950 may allow a user of computer system 900 to interact with one or more non-graphical or graphical user interfaces to enter a comment, select objects, icons, text, user interface widgets, or other user interface elements that appear on a monitor/display device via a command, a click of a button, or the like.

The one or more output devices 955 can output information to one or more destinations for computer system 900. Some examples of the one or more output devices 955 can include a printer, a fax, a feedback device for a mouse or joystick, external storage systems, a monitor or other display device, a communications interface appropriately configured as a transceiver, or the like. The one or more output devices 955 may allow a user of computer system 900 to view objects, icons, text, user interface widgets, or other user interface elements. A display device or monitor may be used with computer system 900 and can include hardware and/or software elements configured for displaying information.

Communications interface 930 can perform communications operations, including sending and receiving data. Some examples of communications interface 930 may include a network communications interface (e.g. Ethernet, Wi-Fi, etc.). For example, communications interface 930 may be coupled to communications network/external bus 960, such as a computer network, a USB hub, or the like. A computer system can include multiple of the same components or subsystems, e.g., connected together by communications interface 930 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

Computer system 900 may also include one or more applications (e.g., software components or functions) to be executed by a processor to execute, perform, or otherwise implement techniques disclosed herein. These applications may be embodied as data and program code 940. Additionally, computer programs, executable computer code, human-readable source code, shader code, rendering engines, or the like, and data, such as image files, models including geometrical descriptions of objects, ordered geometric descriptions of objects, procedural descriptions of models, scene descriptor files, or the like, may be stored in memory subsystem 915 and/or storage subsystem 920.

Such programs may also be encoded and transmitted using carrier signals adapted for transmission via wired, optical, and/or wireless networks conforming to a variety of protocols, including the Internet. As such, a computer readable medium according to examples described herein may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective step or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of this disclosure. However, other embodiments of the disclosure herein may be directed to specific embodiments relating to each individual aspect, or specific combinations of these individual aspects.

The above description of exemplary embodiments of this disclosure have been presented for the purposes of illustration and description. It is not intended to be exhaustive or to limit this disclosure to the precise form described, and many modifications and variations are possible in light of the teaching above. The embodiments were chosen and described in order to best explain the principles of this disclosure and its practical applications to thereby enable others skilled in the art to best utilize this disclosure in various embodiments and with various modifications as are suited to the particular use contemplated.

A recitation of "a", "an" or "the" is intended to mean "one or more" unless specifically indicated to the contrary.

All patents, patent applications, publications, and descriptions mentioned here are incorporated by reference in their entirety for all purposes. None is admitted to be prior art.

What is claimed is:

1. A method for reducing noise in a two-dimensional image obtained from a computer-generated scene, the method comprising:
   receiving a plurality of noisy subimages, wherein a subimage is at least a portion of an image, and wherein each noisy subimage of the plurality of noisy subimages is rendered using a respective set of rays in a corresponding computer-generated scene;

receiving a plurality of refined subimages, each respective refined subimage of the plurality of refined subimages corresponding to a respective noisy subimage of the plurality of noisy subimages and generated using a corresponding computer-generated scene, wherein a respective refined subimage has reduced noise relative to a corresponding noisy subimage;

extracting values of a first set of features from pixels in each of the plurality of noisy subimages;

determining values of a second set of features from information obtained from the corresponding computer-generated scenes from which the plurality of noisy subimages were generated;

training a neural network based on the values of the first set of features, the values of the second set of features, and the plurality of refined subimages, wherein the neural network receives inputs of gradients of pixels of each noisy subimage of the plurality of noisy subimages and outputs gradients of pixels of an output subimage, and wherein the training includes:

generating, using the neural network, the gradients of the pixels of the output subimage for a noisy subimage of the plurality of noisy subimages;

comparing the gradients of the pixels of the output subimage to gradients of the pixels of a refined subimage of the plurality of refined subimages that corresponds to the noisy subimage; and modifying one or more parameters of the neural network based on the comparison;

receiving a new two-dimensional image rendered from a computer-generated scene; and generating, using the neural network after training, a new output image corresponding to the new two-dimensional image.

2. The method of claim 1, wherein a first noisy subimage of the plurality of noisy subimages is rendered using a respective set of rays corresponding to a first computer-generated scene, and wherein a second noisy subimage of the plurality of noisy subimages is rendered using a respective different set of rays for a different set of pixels corresponding to the first computer-generated scene.

3. The method of claim 1, wherein the refined subimage is generated using more rays than the corresponding noisy subimage.

4. The method of claim 1, wherein the refined subimage is a processed version of the corresponding noisy subimage, and wherein the processing includes removing at least a portion of noise from the corresponding noisy subimage using a filter.

5. The method of claim 1, wherein one of the first set of features is associated with a color or an illumination of each pixel of the noisy subimage.

6. The method of claim 1, wherein the one or more parameters that are modified include one or more weights that were determined by the neural network, wherein comparing the output subimage to the refined subimage that corresponds to the noisy subimage includes calculating an error between the gradients of the pixels of the output subimage and the gradients of the pixels of the refined subimage.

7. A non-transitory computer-readable medium storing a computer program that when executed by a processor of a computer cause the processor to implement a computer-implemented method comprising:

receiving a plurality of noisy subimages, wherein a subimage is at least a portion of an image, and wherein each noisy subimage of the plurality of noisy subimages is rendered using a respective set of rays in a corresponding computer-generated scene;

receiving a plurality of refined subimages, each respective refined subimage of the plurality of refined subimages corresponding to a respective noisy subimage of the plurality of noisy subimages and generated using a corresponding computer-generated scene, wherein a respective refined subimage has reduced noise relative to a corresponding noisy subimage;

extracting values of a first set of features from pixels in each of the plurality of noisy subimages;

determining values of a second set of features from information obtained from the corresponding computer-generated scenes from which the plurality of noisy subimages were generated;

training a neural network based on the values of the first set of features, the values of the second set of features, and the plurality of refined subimages, wherein the neural network receives inputs of gradients of pixels of each noisy subimage of the plurality of noisy subimages and outputs gradients of pixels of an output subimage, and wherein the training includes:

generating, using the neural network, the gradients of the pixels of the output subimage for a noisy subimage of the plurality of noisy subimages;

comparing the gradients of the pixels of the output subimage to gradients of the pixels of a refined subimage of the plurality of refined subimages that corresponds to the noisy subimage; and modifying one or more parameters of the neural network based on the comparison;

receiving a new two-dimensional image rendered from a computer-generated scene; and generating, using the neural network after training, a new output image corresponding to the new two-dimensional image.

8. The non-transitory computer-readable medium of claim 7, wherein a first noisy subimage of the plurality of noisy subimages is rendered using a respective set of rays corresponding to a first computer-generated scene, and wherein a second noisy subimage of the plurality of noisy subimages is rendered using a respective different set of rays for a different set of pixels corresponding to the first computer-generated scene.

9. The non-transitory computer-readable medium of claim 7, wherein the refined subimage is generated using more rays than the corresponding noisy subimage.

10. The non-transitory computer-readable medium of claim 7, wherein the refined subimage is a processed version of the corresponding noisy subimage, and wherein the processing includes removing at least a portion of noise from the corresponding noisy subimage using a filter.

11. The non-transitory computer-readable medium of claim 7, wherein one of the first set of features is associated with a color or an illumination of each pixel of the noisy subimage.

12. The non-transitory computer-readable medium of claim 7, wherein the one or more parameters that are modified include one or more weights that were determined by the neural network, wherein comparing the output subimage to the refined subimage that corresponds to the noisy subimage includes calculating an error between the gradients of the pixels of the output subimage and the gradients of the pixels of the refined subimage.

13. A computing system comprising:
one or more processors configured to:
  receive a plurality of noisy subimages, wherein a subimage is at least a portion of an image, and wherein each noisy subimage of the plurality of noisy subimages is rendered using a respective set of rays in a corresponding computer-generated scene;
  receive a plurality of refined subimages, each refined subimage of the plurality of refined subimages corresponding to a respective noisy subimage of the plurality of noisy subimages and generated using a corresponding computer-generated scene, wherein a respective refined subimage has reduced noise relative to a corresponding noisy subimage;
  extract values of a first set of features from pixels in each of the plurality of noisy subimages;
  determine values of a second set of features from information obtained from the corresponding computer-generated scenes from which the plurality of noisy subimages were generated;
  train a neural network based on the values of the first set of features, values of the second set of features, and the plurality of refined subimages, wherein the neural network receives inputs of gradients of pixels of each noisy subimage of the plurality of noisy subimages and outputs gradients of pixels of an output subimage, and wherein the training includes:
    generating, using the neural network, the gradients of pixels of the output subimage for a noisy subimage of the plurality of noisy subimages;
    comparing the gradients of pixels of the output subimage to gradients of the pixels of a refined subimage of the plurality of refined subimages that corresponds to the noisy subimage; and
    modifying one or more parameters of the neural network based on the comparison;
  receive a new two-dimensional image rendered from a computer-generated scene; and
  generate, using the neural network after training, a new output image corresponding to the new two-dimensional image.

14. The computing system of claim 13, wherein one of the first set of features is associated with a color or an illumination of each pixel of the noisy subimage, and wherein one of the second set of features is associated with a shading normal, a depth, or an albedo used to generate the noisy subimage.

15. The computing system of claim 13, wherein the neural network is a first neural network, wherein the first set of features includes an illumination of the pixels of the noisy subimage, wherein the first neural network is trained based on a first light path, wherein a second neural network is trained based on a second light path, and wherein output of the first neural network and the second neural network are combined to generate the new output image.

* * * * *